United States Patent [19]

Reneau

[11] 4,109,940

[45] Aug. 29, 1978

[54] COUPLING APPARATUS

[76] Inventor: Bobby J. Reneau, Rte. 11, Box 380-B, Houston, Tex. 77039

[21] Appl. No.: 544,051

[22] Filed: Jan. 27, 1975

[51] Int. Cl.² ............................................. F16L 35/00
[52] U.S. Cl. ........................................ 285/18; 285/81
[58] Field of Search ...................... 285/18, 81, 96, 106, 285/322, 319, 104, 348, 363, 323, DIG. 21

[56] References Cited

U.S. PATENT DOCUMENTS

| | | | |
|---|---|---|---|
| 1,807,046 | 5/1931 | Rasmussen et al. | 285/363 X |
| 3,353,847 | 11/1967 | Brown | 285/DIG. 21 |
| 3,393,926 | 7/1968 | Arnold | 285/18 |
| 3,598,429 | 6/1971 | Arnold | 285/81 |
| 3,695,634 | 10/1972 | White | 285/322 |
| 3,704,033 | 11/1972 | Arnold | 285/322 |
| 3,784,234 | 1/1974 | Mohr | 285/18 |
| 3,986,728 | 10/1976 | Marsh | 285/322 |

Primary Examiner—Andrew V. Kundrat
Attorney, Agent, or Firm—Donald Gunn

[57] ABSTRACT

For use in connecting first and second pipes, an apparatus which incorporates an external sleeve adapted to be abutted against a flange and positioned about a first pipe and enclosing oppositely facing sets of tapered slips. The slips incorporate serrations to enable them to grip the first pipe. An encircling cavity receives fluid under high pressure and hydraulically forces the two sets of slips to an actuated position, firmly gripping the first pipe. This provides a good mechanical connection of the connector to the first pipe. The second pipe is preferably connected to the flange. A separate set of fluid seals prevent leakage. They are actuated by means of a second set of pistons which hydraulically force the seal members with adequate pressure to cause them to seal the connection of the first and second pipes. The coupling apparatus has a separate mechanical coupling and an isolated seal mechanism which are separately actuated.

10 Claims, 2 Drawing Figures

COUPLING APPARATUS

BACKGROUND OF THE DISCLOSURE

In installation of gathering lines at sea which extend from submerged well head production equipment to a collection facility, it is necessary to install couplings. Often the collection pipe is welded in strings on the surface and coated with concrete weight material to cause it to sink. The surface welded connections cannot be used for the entirety of the length of the line from origin to destination, and it is necessary to install a coupling which is attached mechanically. It is the sort of coupling which can be installed normally only once, and its correct installation is necessary initially. The coupling must be fluid tight and not require service or checking after installation.

The present invention is a coupling which has these virtues. It is a single coupling which isolates the mechanical coupling of pipe from fluid coupling. It incorporates a mechanical coupling which bears up under loading placed on it, and has a separate fluid seal coupling which is not inflicted with the substantial mechanical load carried by the mechanical coupling. The coupling apparatus finds application at other locations such as on land.

SUMMARY OF THE DISCLOSURE

The present invention cooperates with first and second pipes to connect them. It includes a tubular sleeve which encircles the first pipe. The tubular sleeve captures on its interior two sets of latching mechanisms which work against one another. Each set includes a taper, a serrated set of slips, and a piston which forces the slip against the taper, thereby causing the slips to grip and engage the first pipe which is on the interior. Hydraulic fluid is introduced between the pistons under pressure to force them apart. After the pistons move apart, they are held in position by a ratchet mechanism connected between the two pistons. The tubular sleeve connects to a flange plate which bolts to an enlarged housing attached to the end of the second pipe. The enlarged housing receives a set of seal members on its interior against the exterior of the first pipe which is telescoped into the housing. A fluid connection through the housing introduces fluid against a piston arrangement which pressurizes the seal, thereby forcing them into sealing engagement with the interior of the housing and the exterior of the first pipe.

DESCRIPTION OF THE PREFERRED EMBODIMENT

Figure 1:
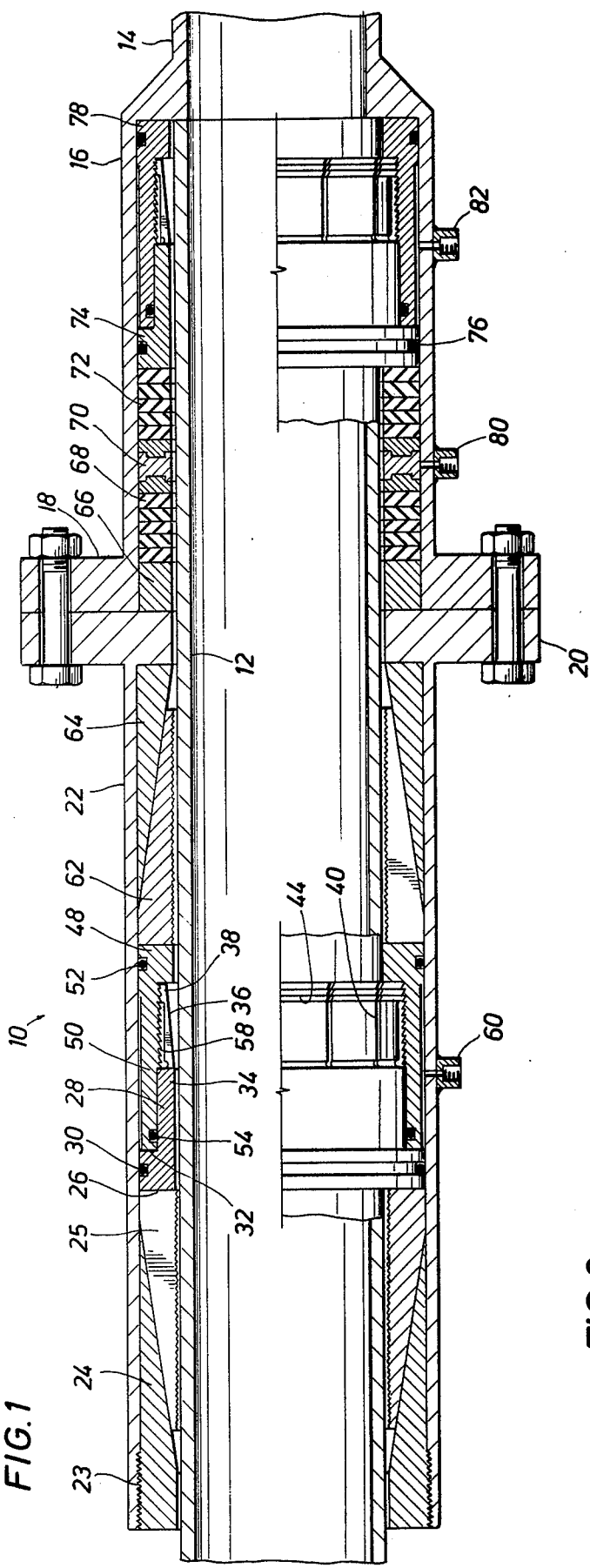
FIG. 1 is a sectional view of the coupling of the present invention disclosing separate mechanical couplings and seal members and means for actuating them and a novel means for retaining the engaged position; and, FIG. 2 is an enlarged sectional view showing details of a ratchet means which holds the mechanical coupling in the engaged position.

In FIG. 1, the coupling 10 cooperates with a first pipe 12 and a second pipe 14. The pipes 12 and 14 are equal preferably in diameter, though this is not mandatory. The coupling 10 of the present invention contemplates the attachment of an enlarged housing 16 to the pipe 14 by means of welding or integral manufacture. The enlarged housing has an internal diameter and length to receive the first pipe 12 and the sealing apparatus of the coupling 10. The enlarged housing extends to a flange plate 18 which is abutted against a similar flange plate 20, and the two are joined by nuts and bolts threaded through bolt holes on a common circle in the two flange plates 18 and 20. Alternatively, an encircling clamp can be used to fasten the flange plates together. The flange plate 20 is connected to a tubular sleeve 22 which is concentrically located around the first pipe 12. The space inside the tubular sleeve generally receives that portion of the equipment which provides the mechanical connection of the two pipes. By contrast, the cavity inside the housing 16 receives the seal portion.

The equipment is assembled in the manner shown in FIG. 1 and the mechanical coupling is made first by application of extremely high fluid pressure thereto. After it has been made fast, the seal apparatus in the housing 16 is then actuated to sealing engagement and made fast. This will be explained in detail. The tubular sleeve 22 is threaded at 23 to engage a hollow member 24 which serves as a taper. The member 24 has a sloping internal face. The tapered body 24 fits about the pipe 12 but it is not necessary that it form a leak-proof connection therewith or even contact the pipe surface. The tapered body 24 works against a tapered slip 25 which is formed of cylindrical stock. The slip 25 has a set of serrations or threads on its inner face against the pipe. They are normally spaced slightly about the pipe in the disassembled state. The tapered slip 25 has an external tapered face extending along its exterior which has an angle matching that of the tapered face on the body 24. In the relaxed condition of FIG. 1, the two faces match and contact along their length. The tapered slip 25 incorporates an abutting end face 26. Force applied to the face 26 forces the slip 25 against the tapered body 24 and deflects it inwardly. The slip 25 has at least two and as many as necessary slots cut therein from each end and interleaved to permit it to deflect inwardly more readily as it is pushed to the left as viewed in FIG. 1. The slots accomodate shrinkage of the encircling tubular body as it is radially loaded. When it is forced to the left, the threads or serrations on its interior face come into contact with the first pipe 12 and grip it firmly.

A slidable piston 28 abuts the face 26 of the slip 25. The piston 28 is concentrically arranged around the pipe 12 and bears against the end face 26. The piston incorporates a seal member 30 which prevents leakage of pressure fluid therepast. The piston bears against the face 26 and is sized to fit snuggly in the tubular sleeve 22. It is not necessary that it contact the pipe. The piston 28 incorporates a shoulder 32 and has an extended body portion 34 which is of reduced diameter. This defines an external step fully encircling the piston 28 to enable a second piston to be slidably positioned against the shoulder 32 and telescopes around the relatively narrow neck portion 34. The neck portion 34 terminates in a set of elongate fingers 36. The fingers 36 define a set of collet fingers separated by individual lengthwise grooves 40. The grooves 40 separate the fingers, and the fingers are thus able to deflect inwardly and outwardly in response to lateral loading. The fingers 36 support finger tips 38 which have a set of threads cut in their exterior face. Treating all the fingers collectively, the finger tips 38 are collectively machined with a set of threads better illustrated at 44 in the lower half of FIG. 1. The threads 44 serve as a ratchet mechanism which will be more fully described.

A second piston 48 has an elongate tubular portion 50 which abuts the shoulder 32 of the first piston 28. The tubular portion extends over the neck portion 34 of the first piston. The second piston is provided with a seal means 52 which engages the surrounding tubular sleeve 22. A second seal member 54 is located on the interior of the tubular portion 50 and seals against the narrow neck portion 34 of the first piston 28. The interior surface of the narrow neck portion 50 is threaded for about one-half of its length at 58. The thread 58 engages the thread 44 at the collet finger tips 38. The threads 58 preferably are cut to define a ratchet mechanism. They are cut with one angled face and a transverse face. The transverse face looks toward the first piston 28. The threads 44 and 58 define a locking threaded arrangement. The piston 28 is hydraulically forced away from the piston 58, causing the collet fingers 36 to ratchet as they are forced axially away from the maximum penetration into the second piston, without rotation. However, they cannot ratchet to enable movement in the opposite direction. Maximum penetration on rethreading is achieved only by rotation. This is convenient at the time of assembly.

The pistons are able to be forced apart by the introduction of hydraulic fluid through a fitting 60. After they have been forced apart, they are held apart by the ratchet mechanism. The ratchet mechanism maintains its position indefinitely.

The first piston 28 sets a first slip 25. The second piston 48 works against a second slip 62. The slip 62 is constructed identically to the slip 25. It is provided with a facing transverse shoulder which contacts the second piston. It has a tapered outer surface and an axially formed central passage with threads formed therein to enable it to grip the pipe 12. The tapered slip 62 is telescoped into a tapered body 64. The tapered body is captured inside the tubular sleeve 22 and abuts the flange plate 20. It is fixed in position and is not movable. The slip 62 is moved by forcing it to the interior of the tapered body 64. The slip 62 also has sets of interleaved axial slots to enable contraction toward the pipe 12.

The housing 16 receives that portion of the equipment which provides the fluid seal. The mechanical connection is achieved to the left of the flange plates 18 and 20. On the right side of the flange plates is a spacer member 66. A stack of seals is shown at 68. Another spacer, a lantern ring, is shown at 70. An additional set of seals 72 is included. The seals can be chevron seals or any other suitable form of seal. The seals are brought into contact with the inner face of the housing 16 and the external face of the pipe 12. The seals are compressed into sealing contact by a piston 74. The piston 74 incorporates a seal ring 76 on its exterior to prevent leakage therepast. For reduction of cost in manufacturing, the piston 74 is preferably identical to the first piston 28 previously described. The piston 74 does not ordinarily carry the loads inflicted on the piston 28. A second piston 78 is preferably similar or identical to the second piston 48 previously described. The first and second pistons 74 and 78 incorporate outwardly facing seal rings to prevent leakage therepast. The second piston 78 extends over a relatively narrow neck portion on the first piston and the two are appropriately sealed. The second piston has a set of internal threads which are engaged by a set of collet fingers. This enables the pistons 74 and 78 to be forced apart hydraulically and maintain their position after relief of hydraulic pressure. FIG. 1 further discloses a threaded fitting 80 adjacent the spacer 70 and in the midst of all of the seals. A hydraulic fitting 82 opens into the space between the first and second pistons. There is a small encircling volume between the first and second pistons in communication with the port 82 to enable fluid pressure to be introduced. The pistons 74 and 78 are held apart by a ratchet mechanism similar to the one previously described.

Figure 2:
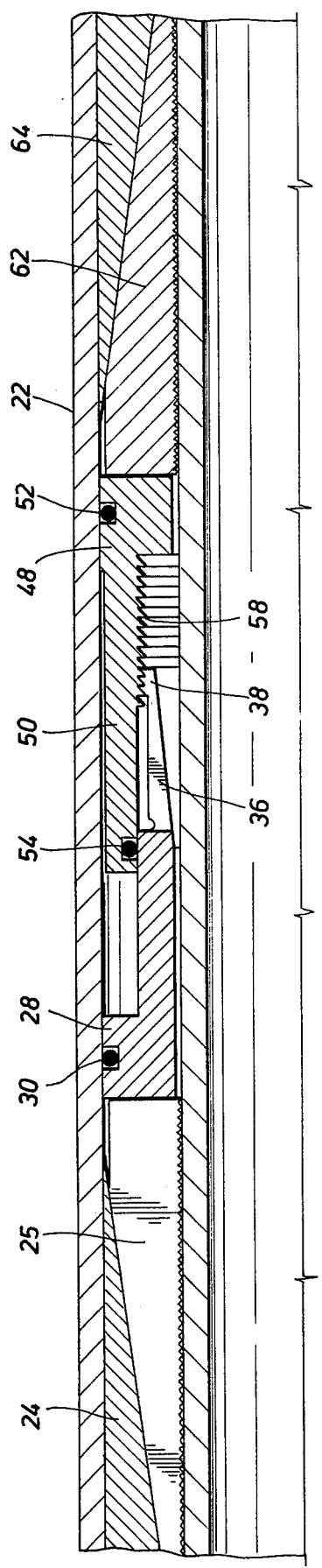

For operation, the housing 16 is attached to the second pipe 14 by welding or integral manufacture. The fluid pressure seal apparatus is positioned in the housing 16. The tubular sleeve 22 and all of the apparatus on its interior is telescoped over the end of the first pipe 12. The first pipe 12 is stabbed into the housing 16 and abutted against the far end of the housing. The flange plate 20 is moved against the flange plate 18 and the two flanges are made fast with appropriate nuts and bolts, or a flange clamp. It is preferable to lock the mechanical anchor first. Hydraulic fluid is introduced through the fitting 60 at extremely high pressures. There is a small cylindrical volume to receive hydraulic fluid between the first and second pistons. It is introduced into this space. As the pressure is increased, the first and second pistons are forced apart as illustrated in FIG. 2. As they move apart, they force the tapered slips 25 and 62 away from one another and against the surrounding tapered bodies 24 and 64, respectively. This movement of the tapered slips forces them into firm binding grip around the first pipe 12, thereby securing the apparatus to the first pipe. When an adequate grip is achieved, it can be released. As the pistons move apart, the collet fingers 36 are pulled from the threads 58 on the interior of the second piston. As the first piston moves to the left, the collet fingers 36 ride over the crest of the threads 58. As the fingers 36 ride over the threads, they move to the left until the separation of the two pistons is completed. When the fluid pressure is removed, there will be a tendency of the collet fingers to slide back to the right. This is accomodated only slightly as the external threads 44 mesh with the internal threads 58. The threads permit only slight movement back to the right, and this movement is limited onto that required to enable the collet fingers to deflect outwardly and achieve complete facial contact with the threads 58.

The fitting 60 can conveniently be closed over with a cap to seal hydraulic fluid in the equipment. Hydraulic oil which will be protective to the parts of the equipment is preferably used. If the apparatus is placed under water for a long interval, water might intrude along the surface of the pipe 12, but it cannot ordinarily come into contact with the machined faces of the pistons. The cap on the fitting 60 can be removed much later and additional pressure fluid applied to the apparatus.

The mechanical connective means has been described. Fluid pressure is applied to the fitting 82 to perfect the leak-proof seal. Fluid is introduced between the first and second pistons 74 and 78. Adequate pressure for operating the seals 68 and 72 is introduced. Excessively large pressure is not normally required. After adequate pressure is attained, the seals are compressed and move radially inwardly and outwardly to perfect sealing contact with the concentrically arranged tubular members about the seal. The fitting 80 permits auxiliary access to the seals. The fitting is preferably capped after a seal has been consummated. A small line connected to the fitting 80 collects any leakage. The piston 78 cannot move to the right, so movement is by the first piston to the left.

The pipe 12 is stabbed into the seals 68 and 72 where its penetration is limited by an end abutting shoulder. However, it is not necessary for the pipe 12 to penetrate to the shoulder, or for the shoulder to be incorporated in the housing 16. The pipe 14 conveniently connects to a flange (not shown) or other downstream equipment. The seal section of apparatus to the right of the flange 18 can be removed and reused. Subsequent reuse requires disassembly of the nest of seal members and rethreading of the ratchet mechanism between the pistons 74 and 78 to the illustrated position of FIG. 1.

The foregoing is directed to a description and installation of the present invention. Many alterations and variations can be incorporated without departing from the scope of the present invention.

I claim:

1. A pipe coupling device for leak-proof connection of two pipes comprising
    a tubular sleeve adapted to be telescoped about a first pipe which extends into said sleeve;
    an expandable pipe gripping means within said sleeve for selectively gripping the first pipe therein;
    a housing which is connected to said sleeve and receives the first pipe therein, said housing incorporating an opening adapted to be connected into a second pipe and which pipe is to be connected to the first pipe;
    an encircling fluid seal means within said housing having an outer surface which seals against said housing and an inner surface which seals against the outer surface of the first pipe on its insertion into said seal means;
    first means for actuating said gripping means to grip the first pipe to hold said sleeve relative to the pipe; and wherein said pipe gripping means and said first means include
    a pair of fluid actuated movable pistons;
    a chamber means for said pistons which is adapted to receive fluid under pressure to force said pistons apart;
    a pair of oppositely facing slips and co-acting tapered surfaces for wedging said slips toward the first pipe to grip and hold the first pipe, said slips working against each other to hold said tubular sleeve relative to the first pipe; and,
    means for securing and holding said pistons apart after movement and,
    second means for actuating said fluid seal means to sealing operation.

2. The apparatus of claim 1 wherein said seal means includes a plurality of circular seal members within said housing and a slidable piston abutting said seal members, and said second means incorporates means for securing and holding said piston after movement to the position achieved on pressurizing said seal members.

3. The apparatus of claim 2 wherein said last named means includes a ratchet mechanism engaging a mating set of shoulders to lock thereagainst.

4. The apparatus of claim 3 wherein said ratchet mechanism includes at least a pair of resiliently deflectable fingers having an exposed face formed into a plurality of threads cut therein, and said mating shoulders are a set of threads formed on a tubular member.

5. The apparatus of claim 4 wherein said fingers are a set of collet fingers movable with said piston along said tubular member.

6. A pipe coupling device for leak-proof connection of two pipes comprising
    a tubular sleeve adapted to be telescoped about a first pipe which extends into said sleeve;
    an expandable pipe gripping means within said sleeve for selectively gripping the first pipe therein;
    a housing which is connected to said sleeve and receives the first pipe therein, said housing incorporating an opening adapted to be connected into a second pipe and which pipe is to be connected to the first pipe;
    an encircling fluid seal means within said housing having an outer surface which seals against said housing and an inner surface which seals against the outer surface of the first pipe on its insertion into said seal means;
    first means for actuating said gripping means to grip the first pipe to hold said sleeve relative to the pipe; and,
    second means for actuating said fluid seal means to sealing operation; p1 wherein said housing encloses
    a plurality of seal elements having an outer surface and an inner surface, which elements seal on axial pressure thereon;
    a shoulder abutting said seal elements;
    a circular piston abutting said seal elements;
    chamber means in said housing for slidably receiving said piston and for receiving a fluid under pressure to force said piston against said seal elements to expand them into sealing contact with the wall of said housing and the first pipe inserted therein; and,
    ratchet means cooperative with said piston for holding its position after movement in said chamber means to continue the force against said seal elements.

7. The apparatus of claim 6 wherein said tubular sleeve encloses
    first and second oppositely facing, axially displaced tapered surfaces;
    first and second radially contractable slips operatively engaged with said tapered surfaces, each having an internal cylindrical surface facing the first pipe on insertion thereinto;
    first and second pistons;
    chamber means for receiving said first and second pistons, said pistons being deployed such that said pistons, on introduction of fluid under pressure, force said slips against said tapered surfaces to cause said slips to contract and grip the pipe and hold it securely relative to said housing;
    a set of deflectable fingers carried on one of said pistons;
    a set of threads on the other of said pistons, said fingers being provided with a ratcheting means thereon and contacted with said threads wherein said threads permit movement of said pistons in a direction to contract said slips and lock with said ratcheting means to prevent movement in the opposite direction.

8. The apparatus of claim 6 wherein said housing and tubular sleeve connect axially at a pair of facing flanges.

9. A pipe coupling device for leak-proof connection of two pipes comprising
    a tubular sleeve adapted to be telescoped about a first pipe which extends into said sleeve;
    an expandable pipe gripping means within said sleeve for selectively gripping the first pipe therein;
    a housing which is connected to said sleeve and receives the first pipe therein, said housing incorporating an opening adapted to be connected into a second pipe and which pipe is to be connected to the first pipe;

an encircling fluid seal means within said housing having an outer surface which seals against said housing and an inner surface which seals against the outer surface of the first pipe on its insertion into said seal means;

first means for actuating said gripping means to grip the first pipe to hold said sleeve relative to the pipe; and, second means for actuating said fluid seal means to sealing operation;

said tubular sleeve enclosing first and second oppositely facing, axially displaced tapered surfaces;

first and second radially contractable slips operatively engaged with said tapered surfaces, each having an internal cylindrical surface facing the first pipe on insertion thereinto;

first and second pistons;

chamber means for receiving said first and second pistons, said pistons being deployed such that said pistons, on introduction of fluid under pressure, said slips against said tapered surfaces to cause said slips to contract and grip the pipe to hold it securely relative to said housing;

a set of deflectable fingers carried on one of said pistons;

a set of threads on the other of said pistons, said fingers being provided with a ratcheting means thereon and contacted with said threads wherein said threads permit movement of said pistons in a direction to contract said slips and lock with said ratcheting means to prevent movement in the opposite direction.

10. A pipe coupling device for leak-proof connection of two pipes comprising a tubular sleeve adapted to be telescoped about a first pipe which extends into said sleeve;

an expandable pipe gripping means within said sleeve for selectively gripping the first pipe therein;

a housing which is connected to said sleeve and receives the first pipe therein, said housing incorporating an opening adapted to be connected into a second pipe and which pipe is to be connected to the first pipe:

encircling fluid seal means within said housing having a sealing surface expandable into a sealing contact with the first pipe positioned therein and said housing, said seal means preventing leakage therepast;

said seal means being positioned relative to said sleeve and said housing to seal leakage from the first and second pipes;

first means for actuating said seal means to sealing operation;

second means independent of said first means for actuating said gripping means to grip the first pipe to secure it in fixed axial relationship and wherein said pipe gripping means and said second means include a pair of fluid actuated movable pistons;

a chamber means for said pistons which is adapted to receive fluid under pressure to force said pistons apart;

a pair of oppositely facing slips and co-acting tapered surfaces for wedging said slips toward the first pipe to grip and hold the first pipe, said slips working against each other to hold said tubular sleeve relative to the first pipe;

lock means for securing said pipe gripping means in the expanded condition after operation of said second means.

* * * * *